Feb. 14, 1950 M. HALLEAD 2,497,768
POWER-DRIVEN CONVEYER
Filed March 27, 1948 3 Sheets-Sheet 1
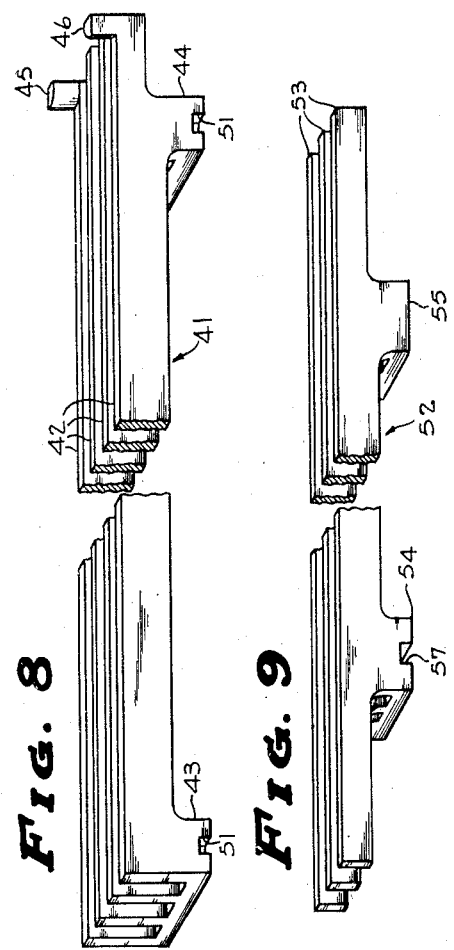
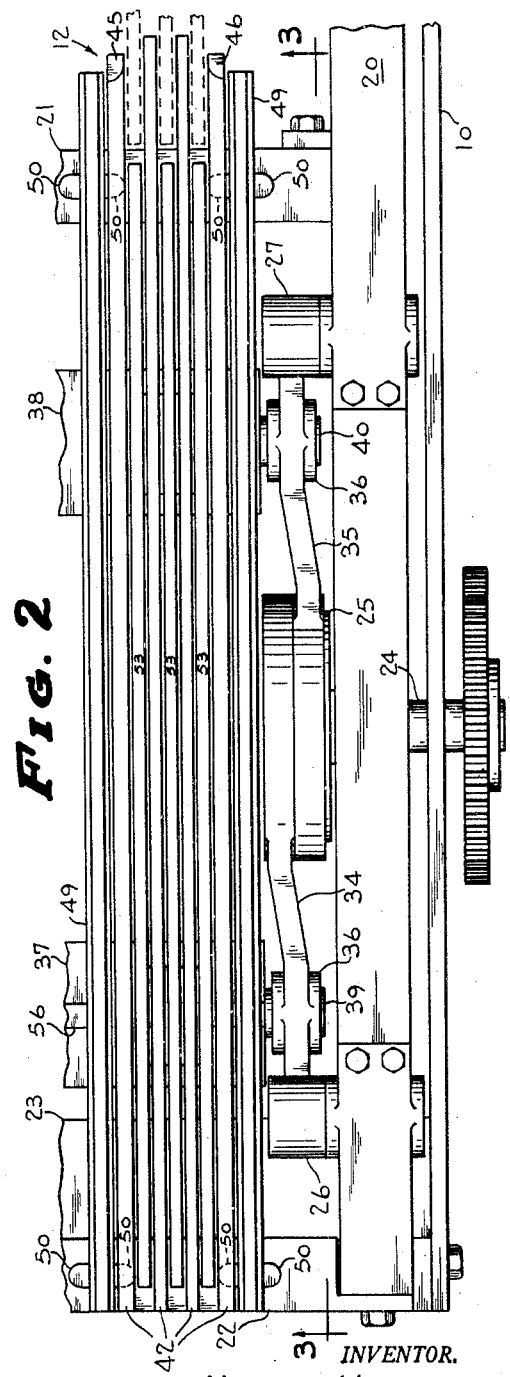
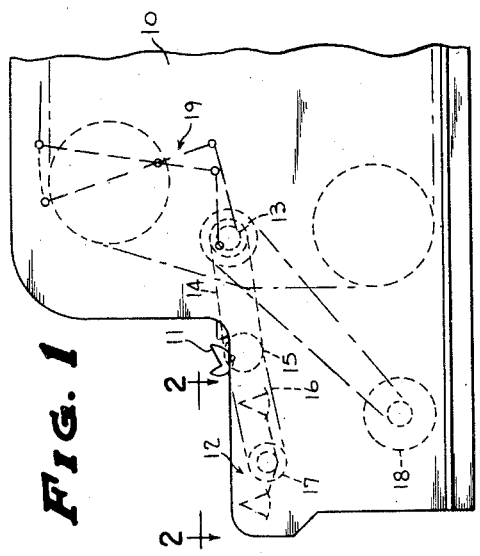
INVENTOR.
MERVIL HALLEAD
BY John W. Michael
ATTORNEY

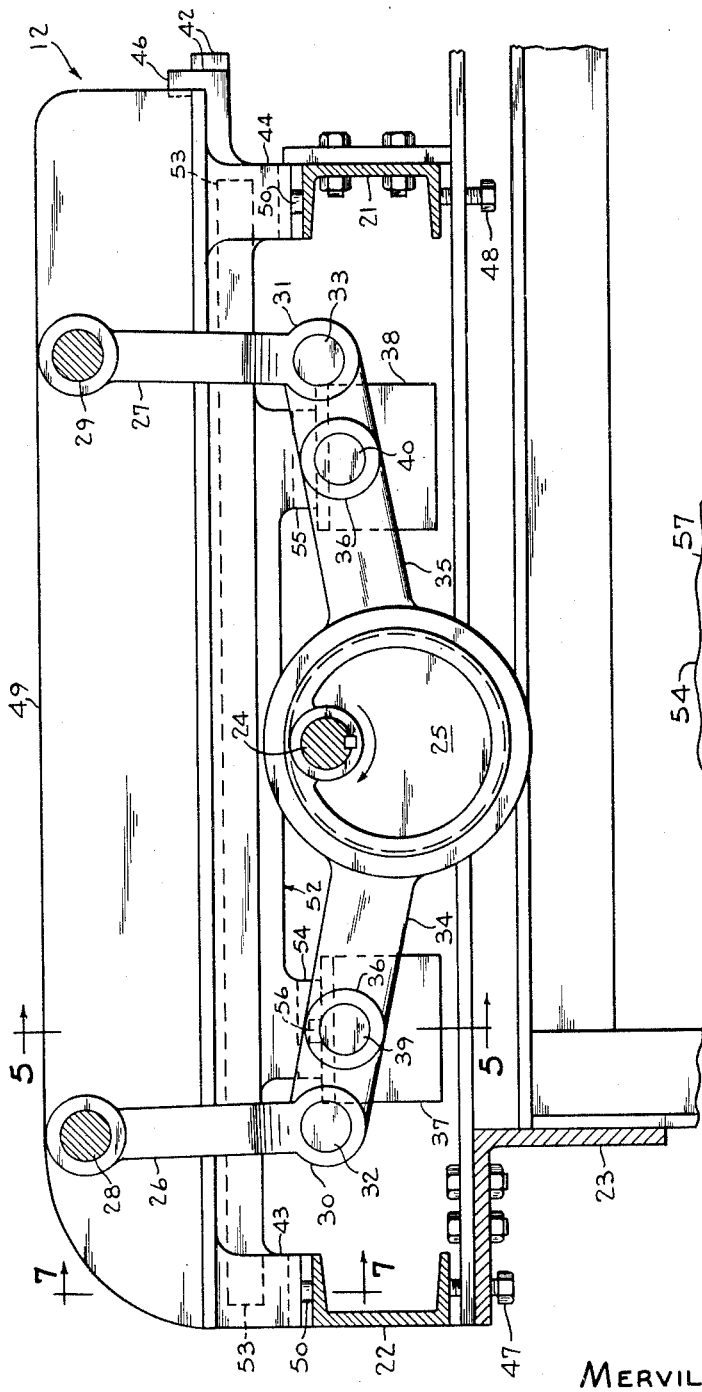
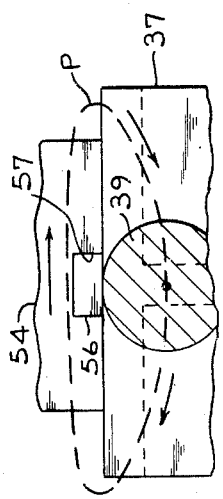

Feb. 14, 1950 M. HALLEAD 2,497,768
POWER-DRIVEN CONVEYER
Filed March 27, 1948 3 Sheets-Sheet 3
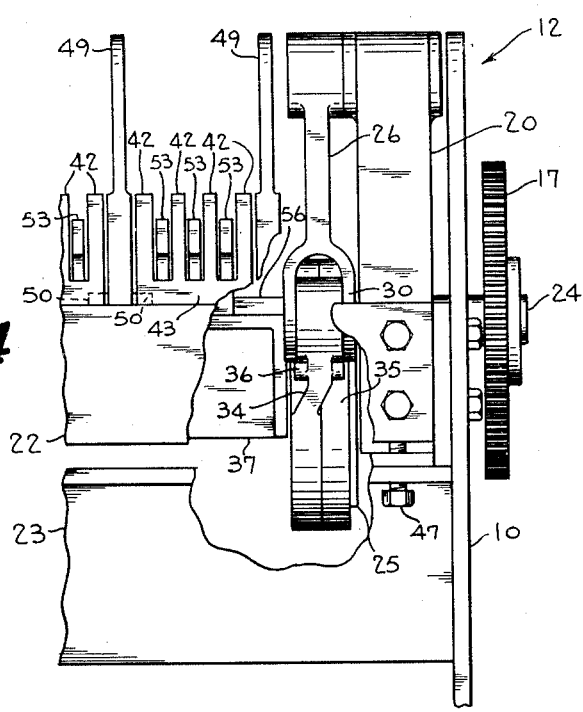
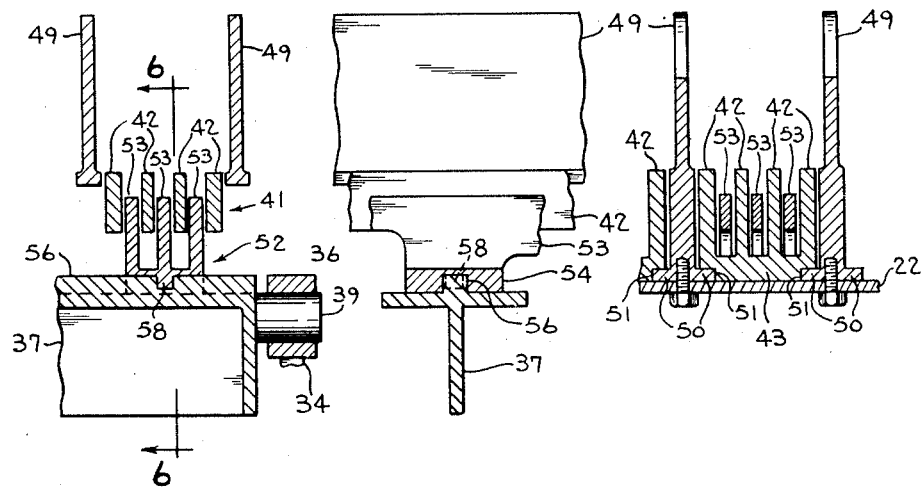
INVENTOR.
MERVIL HALLEAD
BY John W. Michael
ATTORNEY Patented Feb. 14, 1950

2,497,768

UNITED STATES PATENT OFFICE 2,497,768

POWER-DRIVEN CONVEYER

Mervil Hallead, Waukesha, Wis., assignor to Michael Yundt Company, Waukesha, Wis., a corporation of Wisconsin Application March 27, 1948, Serial No. 17,482

8 Claims. (Cl. 198—219)

This invention relates to power-driven conveyers, particularly to such conveyers for advancing containers in step-by-step movement.

Conveyers of this type are used in feeding containers such as bottles or cans to washing, filling, and capping machines and the like. Such a conveyer is disclosed and claimed in the patent to Charles L. Gerlach No. 2,379,571, issued July 3, 1945, for Conveying apparatus. In that conveyer, vertical motion is first imparted to a container-carrying member by a separate mechanism. Another mechanism (synchronizes with the first) then moves the member horizontally. Thus the conveyer has unduly complicated operating mechanism and because the raising and transferring are done as two separate steps it handles the containers roughly causing them to tip over or break.

It is an object of this invention, therefore, to provide a conveyer which will gently transfer containers, such as bottles and the like, in a controlled step-by-step movement.

Another object of the invention is to provide a conveyer, the container supporting and advancing members of which are readily removable for cleaning, inspection, or replacement.

Another object of the invention is to provide a conveyer which is of simple and durable construction, accurate and gentle in operation, and easy and comparatively inexpensive to manufacture.

These objects are obtained by providing a removable relatively stationary container supporting member along which containers may be moved and a removable relatively movable container-engaging member or walking beam which rises up as it moves to engage containers on the stationary support and move them along the stationary support before it lowers while moving to deposit the containers on such support. The two members have interspaced parallel bars which permit of relative movement, the upper surfaces of which support containers thereon. To accomplish the desired movement of the movable member it is supported intermediate the ends of pairs of levers. One end of each lever of a pair is carried for sliding or swinging motion and the other end of each lever of a pair is mounted so as to move in a circular path. As the latter ends are rotated the movable member travels in a path which resembles an ellipse, the top half of which is somewhat flattened. The top half of the path is utilized for simultaneously raising containers from the stationary member and advancing the containers along such stationary member. Thus they are picked up gently, advanced evenly, and then re-deposited softly. The levers are operated by a single crank or eccentric mechanism. Thus the conveyer control is relatively simple and easy and inexpensive to manufacture. The stationary member rests on a fixed support and the movable member rests on supports carried by the levers. Thus both members can be lifted up and removed as a unit. After removal the members may be separated so that the respective bars are no longer interspaced. This permits each unit to be easily cleaned and broken parts replaced.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is a fragmentary diagrammatic view of a container-washing machine with which is associated a power-driven conveyer embodying the present invention;

Fig. 2 is an enlarged fragmentary top plan view of a power-driven conveyer embodying the present invention;

Fig. 3 is a sectional view taken on line 3—3 of Fig. 2;

Fig. 4 is a fragmentary left end view of the conveyer viewed in Figs. 2 and 3 with parts broken away for the sake of clarity in illustration;

Fig. 5 is a fragmentary sectional view taken on the line 5—5 of Fig. 3;

Fig. 6 is a sectional view taken on the line 6—6 of Fig. 5;

Fig. 7 is a sectional view taken on line 7—7 of Fig. 3;

Fig. 8 is a fragmentary perspective view of the relatively stationary member comprising an element of the present invention;

Fig. 9 is a fragmentary perspective view of the relatively movable member comprising an element of the present invention; and Fig. 10 is a fragmentary diagrammatic view showing the path of movement of the supports for the relatively movable member.

Referring to the drawings by reference numerals, the conveyer is associated with a container-washing machine 10 and transfer device 11, such as those described in the application of Mervil Hallead for Transfer device, Ser. No. 17,481, owned by the assignee of this application and copending herewith. The conveyer, indicated generally at 12, receives its driving power from the countershaft 13 by way of chain 14, sprocket 15, chain 16, and sprocket 17. The countershaft 13 is operated from a motor 18 and controls the indexing drive 19 of the container-washing machine 11, thus synchronizing the operation of the machine 10, the transfer device 11, and the conveyer 12. The conveyer 12 will thus advance containers positioned thereon into the pick up station for the transfer device 11 after a preceding container has been removed therefrom. In many installations and uses of the conveyer 12, however, it is not essential that it be synchronized with another device, such as a washing, filling, or capping machine.

Only a single section of the conveyer and its supporting frame and actuating mechanism on one side only is shown. The frame and mechanism (except for sprocket 17) on the side not shown is identical with that on the side shown. There may be any number of sections of the conveyer in a single unit all operated by the same driving shaft. The number depends upon the requirements of the particular machine with which the unit is associated. Hence, only a single section of the conveyer and a complete actuating mechanism will be described.

The frame of the conveyer 12 consists of two longitudinal transversely spaced members 20 connected by vertically adjustable transverse members 21 and 22. This frame may be mounted in the end of the machine 10 on a cross member 23 and other like supports not shown. A transverse shaft 24, mounted in suitable bearings in each of the members 20, is driven by the sprocket 17 to supply the power for operating the conveyer. A pair of eccentrics 25 (only one shown) are mounted on the shaft 24 next to each of the members 20 and rotate therewith to supply circular motion to one end of the levers 34. A pair of links or hangers 26 and 27 are pivotally supported on stub shafts 28 and 29 carried by each of the longitudinal members 20, each link of one pair being opposite an identical link of the other pair. One end of each of levers 34 and 35 is connected by pivots 32 and 33 to the forked lower ends 30 and 31 of links 26 and 27. As shown in Fig. 2, the levers 34 and 35 have laterally offset eccentric straps each of which ride in respective grooves on the eccentric 25. Thus the inner end of each of the levers 34 and 35 is simultaneously moved through a circular path as the shaft 24 rotates. There are two pairs of the levers 34 and 35 (only one pair shown), each lever of a pair being opposite and identical with the lever of the other pair. Each of the levers 34 and 35 is provided with a bearing 36 positioned intermediate the ends of the levers nearer to the pivots 32 and 33 than the eccentric straps. Transverse supporting members 37 and 38 extend respectively from the levers 34 and 35 on one side of the conveyer to the opposite levers on the other side of the conveyer, being pivoted thereto by pivots 39 and 40 riding in the bearings 36. Thus the supports are maintained level as they are moved by the levers.

Whenever the shaft 24 is rotated the axis of the pivots 39 and 40 will each travel through paths identical with that designated P in Fig. 10. This path resembles an ellipse the top half of which is somewhat flattened out as shown. This characteristic of the path P is utilized for operating the relatively movable container-engaging member. While only one relatively movable member is shown in connection with a relatively stationary member, it is possible to use two movable members with their action synchronized so that substantially continuous movement of containers along the conveyer is obtained.

The relatively stationary member 41 is shown in Fig. 8 and consists of a plurality of spaced bars 42, the upper surfaces of which provide a support for containers. These bars are joined by transverse members 43 and 44. If desired, centering lugs 45 and 46 may be used to provide a pick up station and center containers therein. The members 43 and 44 rest on the adjustable transverse members 22 and 21, respectively, and are held in position as later described. By adjusting the members 22 and 21 through adjusting screws 47 and 48 the relative height of the upper surface of the stationary member 41 may be set as desired. In order to guide containers in their travel along the surface of member 41, spaced guides 49 of identical shape are bolted to the transverse members 22 and 21 in the manner indicated in Fig. 7. Each of the guides 49 have small feet 50 which act not only to support the guides upright but also provide lugs for locking the stationary member 41 in place. That member is provided with recesses 51 which fit over the feet 50 to prevent member 41 from moving longitudinally but still permitting it to be readily withdrawn upwardly from between the guides 49.

The relatively movable member 52 is comprised of three spaced bars 53 joined by transverse members 54 and 55. The bars 53 are insertible between the bars 42 of member 41 so as to be interspaced in parallel relationship therewith. In making an insertion, one end of the member 52 is first inserted over one of the members 43 or 44 and then slid longitudinally with respect to the other member an amount sufficient to permit its other end to be inserted over such other transverse member. The transverse members 54 and 55 rest on the supporting members 37 and 38, respectively, and move therewith as said supporting members travel through their respective paths. While the shape of the respective paths is identical, there is still some relative horizontal movement between the supporting members 37 and 38. Because of this, the horizontal movement to be imparted to the member 52 is imparted through only one of the transverse members. As shown, this is accomplished by a key 56 running across the top of support 37 over which fits a slot 57 formed in the transverse member 54. However, in order to center the member 52 laterally so that it stays in interspaced relationship with the stationary member 41, there is provided in the slot 57 a peg 58 (see Figs. 5 and 6) which fits in a correspondingly numbered hole in the top of the key 56.

To properly adjust the conveyer, the shaft 24 is rotated until the movable member 52 starts to rise at one end of its path of travel. When it reaches the peak of its rise next to such end the corresponding end of member 41 is vertically adjusted so that the surface of the bars 42 is the desired amount below the surface of the bars 53. The shaft 24 is then rotated through substantially 180° until the movable member 52 starts to lower at the other end of its horizontal travel. The other end of the fixed member 41 is then vertically adjusted so that the surface of the bars 53 is the same height above the surface of the bars 42 as was the case at the other end.

In operation of the device as so adjusted, the relatively moving member 52 adjacent one end of its path of travel gently raises as it also advances and engages the bottom of a container resting on the fixed member 41, raising it and advancing it smoothly until the other end of the longitudinal travel of the movable bar is reached. At this time the member 52, while still advancing, gradually lowers with respect to member 41 and softly deposits the container in the advanced position on the surface of the stationary member 41. During the return stroke, the movable member 42 is of course below the surface of the fixed member 41 and containers thereon are not disturbed. The device may be reversed and operated in an identical manner, thus making it very flexible for use in machines where reversal of motion is often required.

Adjustment of the length of horizontal travel may be had within small limits by adjusting the height of the stationary conveyer 41. If the height of the fixed member 41 is lowered with respect to the upper portion of path P, the movable member 52 will engage containers on the fixed member at the beginning of the path of upper horizontal travel, whereas if the height of the fixed member is raised with respect to the upper portion of path P the movable member 52 will not engage the containers resting on the member 41 until after the member 52 has gone through a slight portion of its horizontal travel. Thus, the total horizontal distance of travel can be controlled within small limits. This feature of the conveyer tends to make it more flexible and adaptable for use with containers of varying sizes, particularly where it is desired to advance the container by one step into a pick up station from which it may be picked up by a transfer device such as that indicated at 11.

Although only one embodiment of the invention is shown and described herein, it will be understood that this application is intended to cover such changes or modifications as come within the spirit of the invention or scope of the following claims.

I claim:

1. A conveyer comprising supporting links, levers having an end thereof pivoted to respective links, the other end of said levers being mounted on a common pivotal axis, means for moving said pivotal axis in a circular path, a pair of relatively movable article-supporting members one of which is carried intermediate the ends of said levers, one of said members being non-slidable with respect to one lever and slidable with respect to another lever.

2. A conveyer comprising spaced longitudinal members, a transverse shaft rotatably carried by said members, a pair of eccentrics mounted on said shaft adjacent said members, a pair of hangers pivotally supported on each of said members, each hanger of a pair being on the opposite sides of said eccentric, a lever extending between each of said hangers and a respective one of said eccentrics, supports extending transversely of said conveyer one from each lever on one side of said conveyer to oppositely related levers on the other side of said conveyer, said supports being pivotally mounted intermediate the ends of said levers, a relatively fixed member having a container-supporting surface, and a relatively movable member mounted on said supports and having a container-engaging surface adapted to engage a container on said relatively fixed member during a portion of the path of travel of said relatively movable member.

3. A conveyer as claimed in claim 2 in which the fixed member and relatively movable member have interspaced parallel bars providing the surfaces for engaging a container.

4. A conveyer as claimed in claim 2 in which the height of the relatively fixed member is adjustable to determine the amount that the container-engaging surface of said relatively movable member will rise above the surface of said fixed member during a portion of its travel.

5. A conveyer as claimed in claim 2 in which said relatively movable member is keyed to one of said supports and slidably rests upon the other of said supports.

6. A conveyer as claimed in claim 2 in which said fixed member and said relatively movable member have interspaced bars and in which both members may be raised upwardly from said conveyer and removed as a unit.

7. A conveyer comprising a stationary member having spaced bars providing a container-supporting surface, a framework upon which said member is vertically adjustably positioned, linkage for supporting and moving a movable member including levers having their inner ends mounted on a common pivotal axis and their outer ends supported for back and forth movement, means for moving said pivotal axis in a circular path, and a movable member carried on said levers intermediate the ends thereof and secured to one of said levers to prevent relative linear movement with respect thereto whereby said member travels in a path which resembles an ellipse the top half of which is somewhat flattened, said movable member having spaced bars interspaced with the bars of said stationary member and raising above and moving longitudinally of said stationary bars to engage and move containers resting on such bars during part of the travel of said movable member through the top half of said path, vertical adjustment of said stationary member affecting the length of the path of travel of said movable member bars while above the stationary bars.

8. A conveyer comprising a pair of relatively movable members having article-engaging surfaces adapted to alternately engage and support articles, a lever for supporting and moving one of said members, one end of said lever being mounted for reciprocal movement in a prescribed path, and means for moving the other end of said lever around a circular path, said one of said members being attached to said lever intermediate the ends thereof to cause said one of said members to move relative to the other of said members in a path which resembles an ellipse the top half of which is somewhat flattened.

MERVIL HALLEAD.

REFERENCES CITED

The following references are of record in the file of this patent:

UNITED STATES PATENTS

| Number | Name | Date |
|---|---|---|
| 754,229 | McDonald | Mar. 8, 1904 |
| 1,000,828 | Lorrillard | Aug. 15, 1911 |
| 1,486,984 | McKee | Mar. 18, 1924 |